Nov. 30, 1965 | E. C. WALSH | 3,220,646

VOICE DRIVEN COMPUTER

Filed March 13, 1963 | 5 Sheets-Sheet 1

INVENTOR.

Edward C. Walsh

INVENTOR.
Edward C. Walsh

VOICE DRIVEN COMPUTER

INVENTOR.

Edward C. Walsh

Nov. 30, 1965 E. C. WALSH 3,220,646

VOICE DRIVEN COMPUTER

Filed March 13, 1963 5 Sheets-Sheet 4

INVENTOR.

Edward C. Walsh

VOICE DRIVEN COMPUTER

INVENTOR.
Edward C. Walsh

United States Patent Office 3,220,646

Patented Nov. 30, 1965

3,220,646

VOICE DRIVEN COMPUTER

Edward C. Walsh, 431 W. 7th St., Los Angeles, Calif.

Filed Mar. 13, 1963, Ser. No. 264,935

15 Claims. (Cl. 235—91)

This application is a continuation in part of my application Serial No. 173,561, filed February 15, 1962.

This invention relates to improvements in manual counting devices and calculating machines, especially adding machines.

In preferred forms of the invention it utilizes commercially available counters or modified forms of such counters. The structure of commercial counters is, of course, well known and conventional in the art.

A first object of the invention is to make it possible to manually count by means of a counter at a speed which is increased by a factor of ten or more. To accomplish this, preferred forms of the invention utilize manual input means in the form of a dial resembling a telephone dial. This dial has ten equally angularly spaced finger holes and always rotates in one direction, such as, for adding. A single one of such dials may be used to actuate the input shaft of a known type of counter. The technique of dialing is the same as that in operating a telephone dial and a second object of the invention is to adapt the skill of persons in operating a telephone dial to rapid counting and calculating.

With reference to known forms of commercial counters, they usually have a plurality of counter wheels representing units, tens, hundreds, thousands, etc. with carry-overs between counter wheels, that is devices, for moving a wheel through one step, that is one count, in response to a full revolution of an adjacent wheel.

Another object of the invention is to make it possible to greatly increase the counting rate and enhance the computing capabilities by providing for manual inputs, as described in the foregoing, to not only the first wheel but to a plurality of individual counter wheels. By this means any number of counts from one to ten may be individually fed into any selected counter wheel.

A further object of the invention is to provide improved means for realizing the previous object.

Another object is to provide means for realizing the previous object in an unusually simplified way wherein the counter wheels and the manual input rotors are combined rather than being separate.

A characteristic of the herein invention is that it is embodied in devices wherein the indicator or counter wheels rotate about a common axis; the invention is characterized in that type of device. A further object of the invention is to provide an improved means for feeding inputs to a plurality of the counter wheels rather than only a single counter wheel wherein the counter wheels are mounted on concentric telescoping input shafts.

Another object of the invention is to provide means for realizing the foregoing objects wherein electromagnetic means are provided for individually actuating selected counter wheels and for doing this in a simple way by means of a single manual input dial or rotor of the type described above.

Another object of the invention is to provide improved means for realizing the foregoing objects wherein a plurality of manually operable input rotors are provided geared to input shafts of the rotors in a three to one ratio, the manual input rotors having thirty dialing holes.

Another object of the invention is to provide improved means for realizing the foregoing object utilizing manual input rotors as in the previous object having direct drive to the individual counter wheels.

Another object is to provide improved dialing means comprising a rotatable stylus bar carrying styluses positioned to engage with dialing holes in the manual input rotors.

Another object of the invention is to provide a device of the type referred to in the foregoing wherein calculations such as addition can be performed by dialing in a manner duplicating that in which a telephone number is dialed. This object is realized by a type of device wherein individual counter wheels can be selectively actuated by a single electromagnet responsive to a single manually operated dial input rotor. This form of the invention embodies a semi-automatic sequencing mechanism so that successive operations of the input dial feed counts into successive counter wheels corresponding to digits in a number being added.

A further object is to provide a device as in the foregoing object wherein the input is in the form of audible speech spoken into a microphone.

From the foregoing, it will be observed that the invention has many adaptations and avenues of utilization such as calculating grocery bills in supermarkets, figuring bridge scores, etc., etc.

Further objects and advantages of the invention will become apparent from the following detailed description and annexed drawings wherein.

Figure 1:
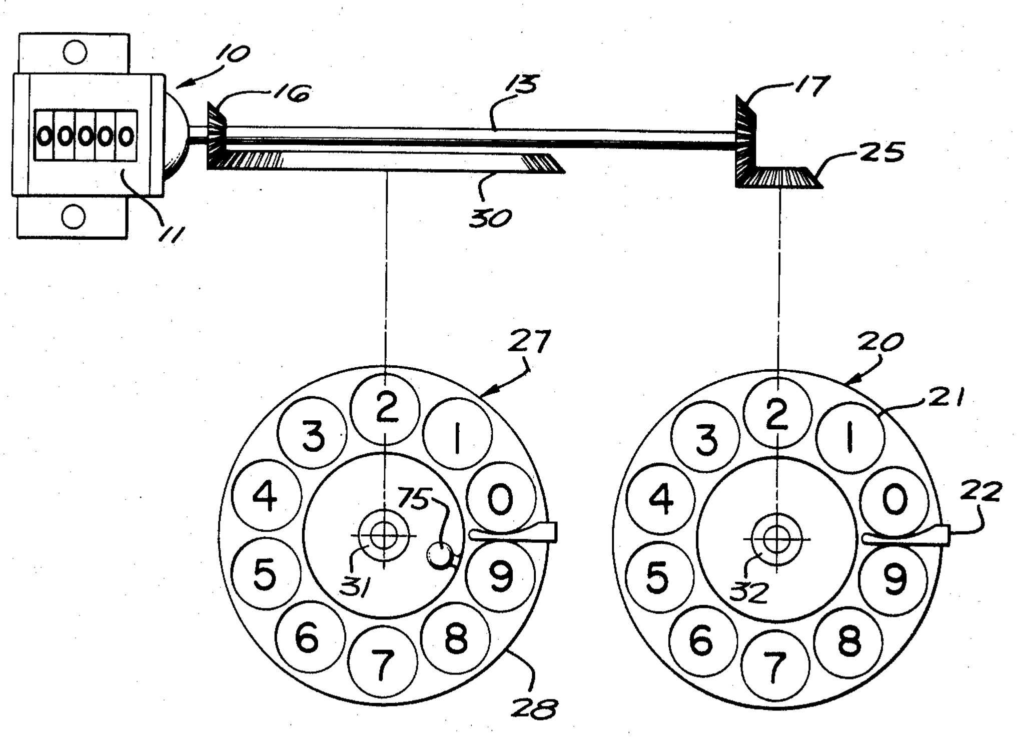
FIGURE 1 is a diagrammatic view of one form of the invention.

Referring now in particular to FIGURE 1, numeral 10 designates by way of example a small mechanical counter which may be of a known commercial type. It has a rectangular casing with a window 11, as shown, through which may be seen five separate dials concentrically mounted. As known in the art, the dial farthest to the right reads units, next tens, and the next hundreds, etc. The counter has an input shaft as shown at 13 and if desired, the counter may be of a type having a reset lever by manipulation of which the counter is reset to zero.

Mounted on the shaft 13 are bevel gears 16 and 17. Numeral 20 designates a flat dial of approximately the size shown. It has ten equally spaced operating holes as shown, for example, at 21 providing for operation of the dial in the manner of operating a telephone dial. Numeral 22 designates a finger stop associated with the dial. Preferably the dial is on a shaft and behind it is a fixed member carrying numeral designations or indications from 0 to 9 behind the respective finger holes. The dial 20 is on a shaft carrying a bevel gear 25 meshing with the gear 17. These gears are of the same size so that there is a direct drive between dial 20 and shaft 13. As may be seen, therefore, any number from 1 to 9 may be dialed by the dial 20 which will in turn register on the first dial of the counter 10.

In the counter 10, which as stated, is a commercially available device, the first dial to the right registers one count for every one-tenth revolution of the shaft 13. Accordingly, for every one-tenth revolution of the dial 20 the first dial to the right of counter 10 registers one count. That is, if 4 is dialed on the dial 20 starting from 0 on the counter 10, the first dial to the right will register 4. Now, if another number between 1 and 9 is dialed on the dial 20 it will add cumulatively to what was registered on the counter 10. Whenever the first dial on the right of counter 10 goes through 0, the carry-over mechanism causes a count of one more to be registered on the next dial to the left.

Numeral 27 designates a similar dial having a finger stop 28 and mounted on a shaft carrying bevel gear 30. Bevel gear 30 meshes with gear 16 and these gears are in a 10:1 ratio so that one revolution of dial 27 produces ten revolutions of shaft 13. In other words, one-tenth of a revolution of the dial 27 will produce a full revolution of the dial farthest to the right of counter 10 and a carry-over of one count to the next dial, that is the tens dial. Thus by way of example, if 3 is dialed on the dial 27 this will result in three full revolutions of the shaft 13 adding a count of 3 to the second dial, that is the tens dial, of the counter 10.

The operating speed of counters of the type shown at 10 is such that they will readily accommodate themselves to a counting speed corresponding to the speed of normal manual dialing of a dial, such as 27, with a ratio of 10:1 in the drive from this dial to the shaft 13.

Each of the dials 20 and 27 preferably has a ratchet mounting 31–32 on their shafts so that they drive in only one direction and one does not drive the other. Or the bevel gears may be ratchet mounted. The number of ratchet teeth is a multiple of ten to preserve synchronism.

The device as so far described might, of course, be one equipped with only one of the dials and simply used for rapid counting one-by-one or in multiples of from 1 to 9. The single dial might, of course, be directly mounted on the shaft 13 producing an extremely small, compact, rapid counting device since the counter 10 may itself be very small occupying a space of roughly a cube one and one-half inch on each side.

The dials 20 and 27 may be made only large enough to conveniently accommodate ten holes large enough to conveniently dial with the finger. The dials 20 and 27 could, of course, be made very small with very small operating holes in them adapted for operation by a stylus or pick.

For adding up to higher amounts, more dials might be provided similarly geared to the shaft 13, this being limited by the counting speed which the counter 10 is capable of. However, in another form of the invention, the capability of the device may be increased by having another operating shaft extending from the left side of the counter, such shaft being connected to the central dial of the counter 10. Further finger dials for hundreds and thousands would be connected to this shaft in the same manner that dials 20 and 27 are connected to the shaft 13, that is the hundreds finger dial would be directly connected to the shaft and the thousands finger dial would be connected to it in a 10:1 ratio.

Figure 2:
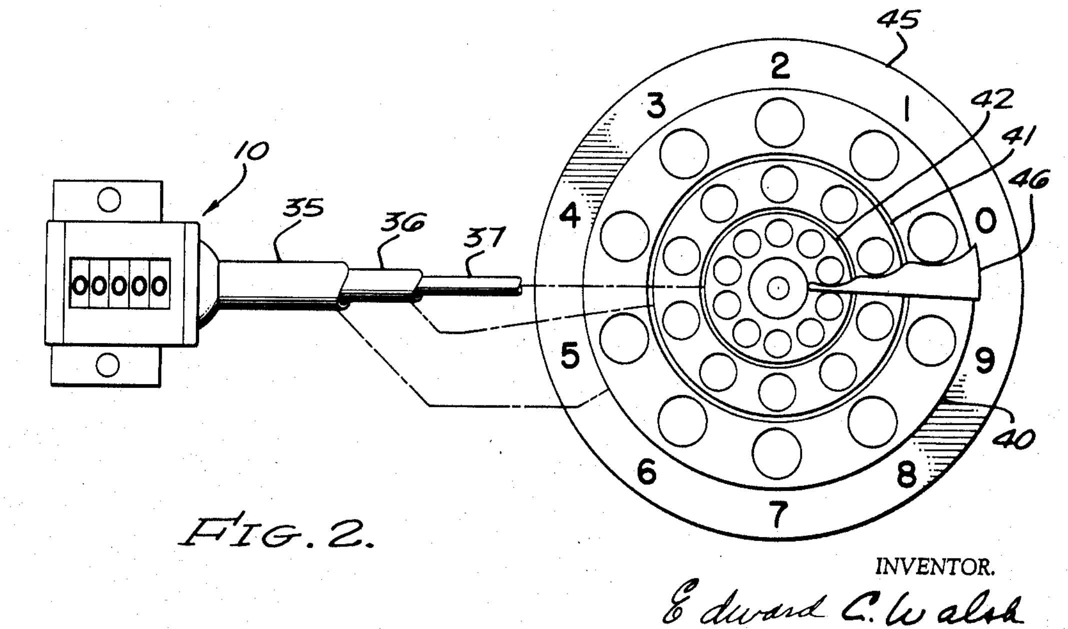
FIGURE 2 is a diagrammatic view of another form of the invention.

FIGURE 2 shows another form of the invention wherein the counter 10 is similar except that it is provided with three concentric input shafts as shown at 35, 36 and 37. Counter 10 may be like that shown in detail in FIGS. 6, 7 and 8. Shaft 35 connects to the units dial of the counter; shaft 36 connects to the tens dial and shaft 37 connects to the hundreds dial. Shafts 35, 36 and 37 have mounted on them respectively manually operated dials 40, 41 and 42. These dials are concentric and may be made of various sizes, for example, they may be made of sizes such that each one can accommodate ten equally spaced finger holes of a size convenient for manually dialing. Or these dials may be made considerably smaller with small operating holes adapting them for dialing by using a stylus or pick.

In back of the dials is a fixed member 45 having indicia from 0 to 9 on it as shown opposite the equally spaced operating holes. Numeral 46 designates a finger or dialing stop associated with the dials.

In the operation of the device of FIGURE 2, dialing of the outer dial 40 operates shaft 35 which connects to the units dial of the counter 10 causing it to register as described in connection with FIGURE 1.

The second dial 41 rotates the next shaft 36 which is directly connected to the tens dial of the counter 10 causing this dial to register. The innermost dial 42 is connected to the central shaft 37 which connects to the hundreds dial of the counter 10. When a dial of the counter 10 completes a revolution, it carries over one count to the next dial to the left as is known in the arl in this type of mechanical counter.

The devices as so far described have numerous applications because of their mechanical simplicity, cheapness, small size and extreme simplicity of operation not requiring skill or instruction other than knowing how to dial a telephone. The devices are capable of numerous applications including ordinary hand counting at a more rapid rate such as traffic counting, scoring, counting of the number of persons present at gatherings, etc. However, the devices have much broader applications in the field of adding and computing. The devices adapt themselves ideally to counting money, for example, in supermarkets where customers wish to total the amount of their purchases which they may readily do with a counter of the invention as they take their purchases off the shelves. The device might conveniently be mounted on the wheeled market basket carriages utilized in supermarkets enabling the customers to have their purchases totalled at the time they go past the cashier for payment so that they can check their own total with that of the cashier. In counting money, the dials of a device such as shown in FIGURE 2, may be conveniently thought of as the outer dial being for pennies. the second dial for dimes and the third dial for dollars.

Figure 3:
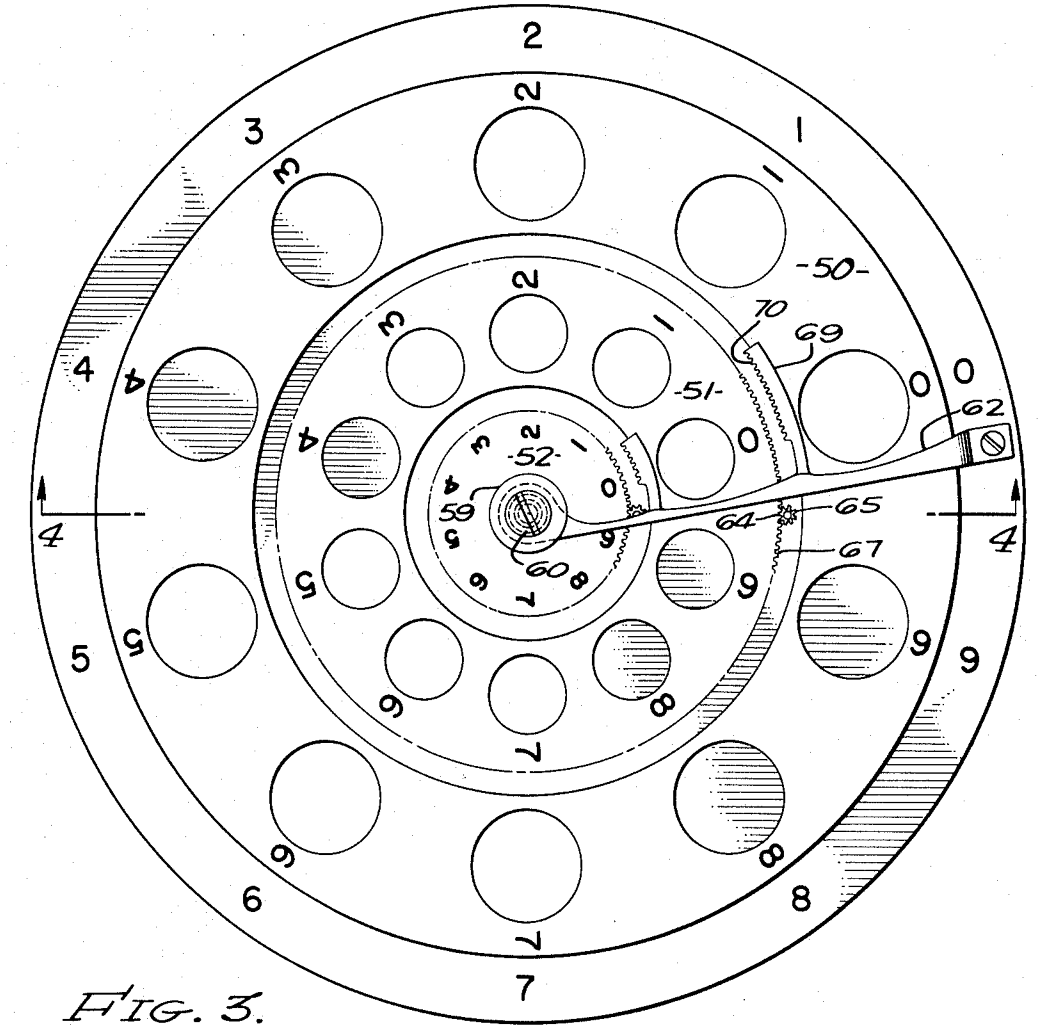
FIGURE 3 is a plan view of another form of the invention.
Figure 4:
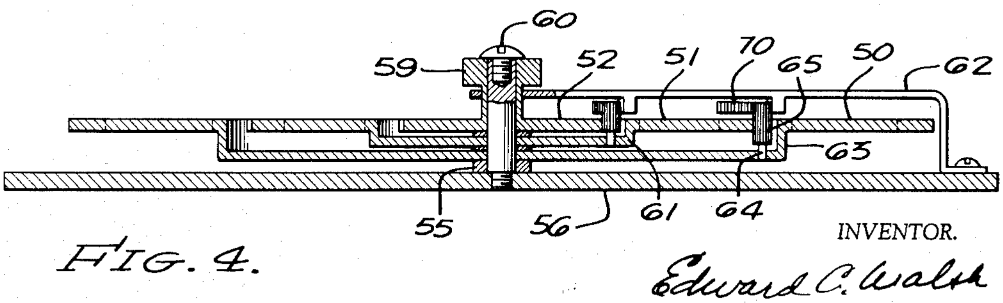
FIGURE 4 is a sectional view taken along the line 4—4 of FIGURE 3.

FIGURES 3 and 4 show another form of the invention wherein the mechanical counter 10 of the previous embodiments is not used. In this form of the invention, there are three concentric dials 50, 51 and 52. Dials 50 and 51 have ten equally angularly spaced dialing holes as in the previous embodiments. The dials are mounted on a central stem 55 suitably attached to a base 56. The base carries indicia from 0 to 9 around the periphery of the outer dial 50. On the end of the stem 55 is a knob 59 connected by a sleeve as shown to the central dial 52. The central dial in this embodiment does not have operating holes but is made relatively small and is adapted to be turned for counting dollars, for example, by manually rotating the knob 59 which is held onto the stem 55 by screw 60.

Extending between the central stem and the periphery of the base 56 is a member 62 shaped to form a finger stop for the dials 50 and 51.

Each of the dials carries indicia in the way of numbers from 0 to 9 adjacent its periphery and opposite the holes, with reference to the two dials 50 and 51. These numbers serve to indicate the totals of the amounts added or counted by the device.

Pick-ups or carry-overs are provided between adjacent dials so that a full rotation of one transmits or transfers one-tenth of a revolution to the next dial. As may be seen in the figures, the dials 50 and 51 are slightly cup-shaped having central circular offsets or depressions as shown respectively at 61 and 63. Near the edge of the offset 63 there is provided a stem 64 carrying a small rotatable gear 65 positioned between the dial 51 and the edge of the dial 50 as shown. The dial 51 has peripheral gear teeth as shown at 67 meshing with the gear 65. Numeral 69 designates an arcuate member attached to the member 62 having gear teeth as shown at 70 forming an arcuate rack. When the dial 50 is about to complete a revolution, the gear 65 engages the rack teeth 70 causing the gear 65 to rotate in a counterclockwise direction and since it is in mesh with the gear teeth 70 it rotates the dial 51 through a tenth of a revolution while the dial 50 completes its revolution. That is, for each revolution of the dial 50, the dial 51 is rotated through a tenth of a revolution, that is in an amount to add one count on this dial.

A similar carry-over or pick-up mechanism is provided as between the dials 51 and 52 and since this carry-over mechanism is the same in construction, it will not be described in detail. It is to be understood that other forms of pick-up or carry-over mechanisms might be provided between adjacent dials. Also, the dials might be made large enough so that the dial 52 could accommodate ten finger holes like the other dials. Or, on the other hand, all of the dials might be made relatively small with the operating holes of a size to facilitate dialing by means of a stylus or pick.

The operation is similar to that of the previous embodiments. Numbers from 1 to 9 are dialed in on the dial 50, complete revolutions being carried over to add one count to the next dial. Tens are dialed in on the dial 51 and when counting money, if amounts of from 1 to 9 dollars are to be fed in, this is done by rotating the knob 59 the appropriate amount. In the embodiment disclosed, the device is made of a size to accommodate finger holes in the dials 50 and 51 without making the over-all size of the device unusually large.

As may be observed, the device may be very economically manufactured from very light sheet metal or plastic or other comparable materials or might even be made of cardboard utilizing appropriate types of carry-over or pick-up mechanisms adapted to use with cardboard dials. Preferably spacers are provided between the dials as shown in FIGURE 4 and between the bottom dial and the base member to separate the dials so that one dial does not rotate another through friction. Also the dials 50 and 51 in a more simplified form, may be simply flat discs rather than having the offsets therein, the offsets preferably being provided so that the indicating surfaces of the dials all lie in the same plane.

Figures 5, 6, 7, 8, 17:
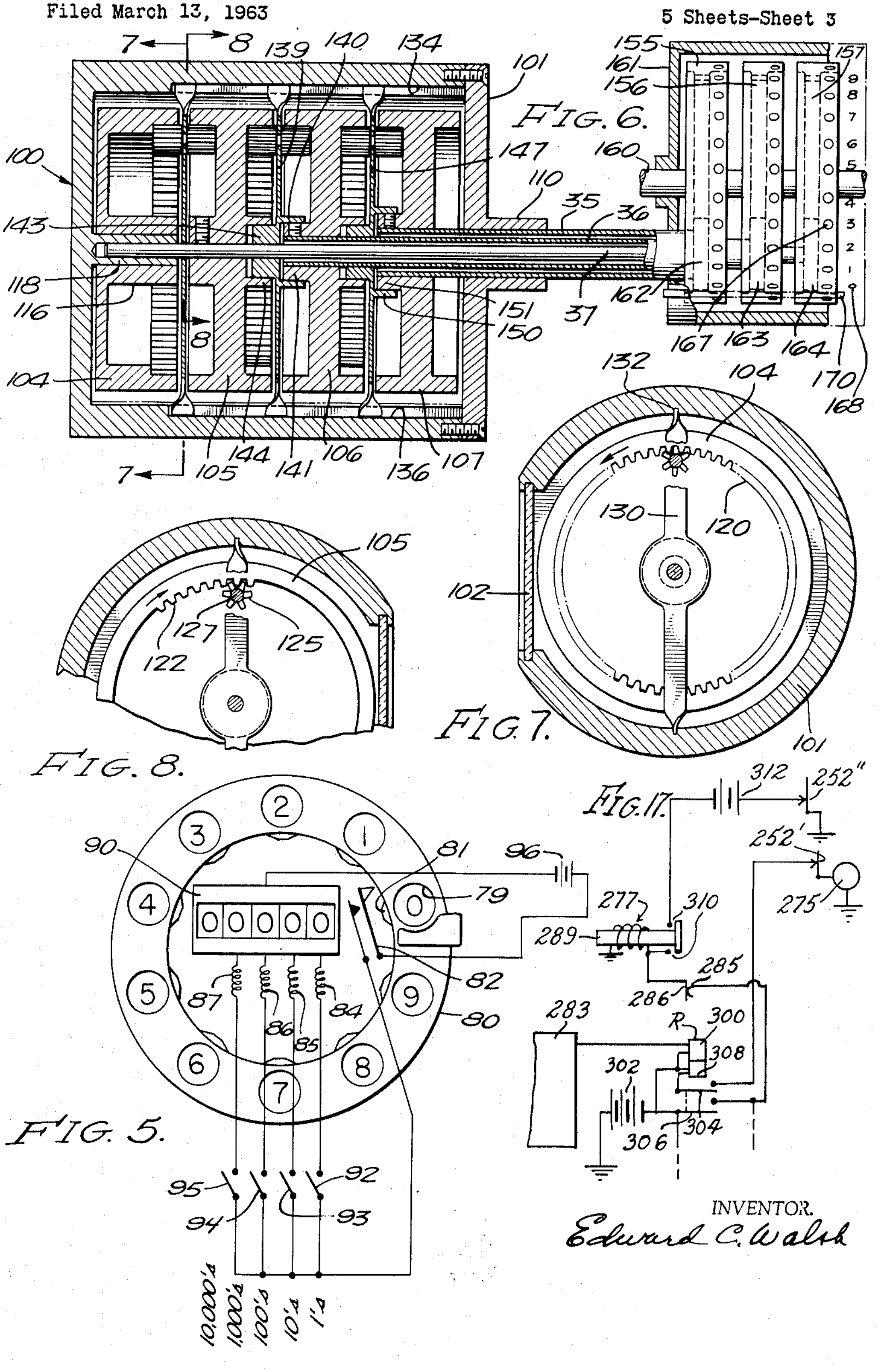
FIGURE 5 is a diagrammatic view of another form of the invention.
FIGURES 6, 7 and 8 are views of another form of the invention.
FIGURE 17 is a schematic circuit diagram illustrating an obvious manner of controlling the parts of FIGURES 14–16.
Figure 9:
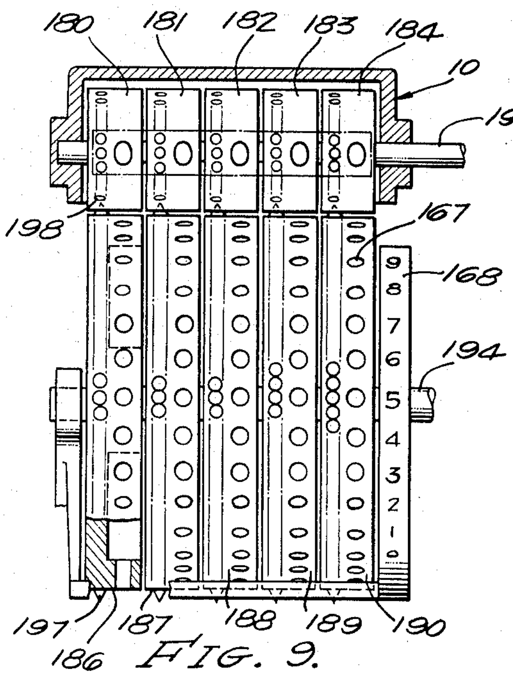
FIGURES 9 to 13 are views of another form of the invention.
Figure 12:
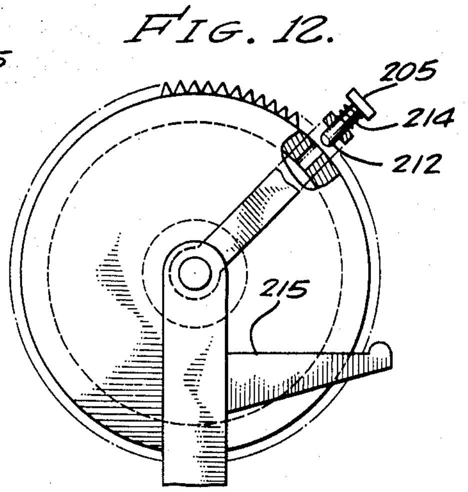

FIGURE 5 is a modified form of the invention which is electrical. A single dial 80 is provided having finger holes 79 and projections 81 on the inside, one for each hole, which actuate switch 82. This switch controls electromagnetic actuators 84–87, one for actuating each of four wheels of counter 90, one step for each actuation. The counter 90 has the usual carry-over mechanism between wheels. The electromagnets are also controlled by manual toggle or button switches 92–95 so that the dial operates only one counter wheel at a time, either units, ten, hundreds or thousands. Numeral 96 designates a power source. An extremely simple but fast and economical counter or computer is thus provided. The actuators for each wheel may be in the form of a pawl and ratchet mechanism.

FIGURES 6, 7 and 8 show a form of the invention similar to that of FIGURE 2, but instead of using telephone type dials, a type of dialing wheel is used that is dialed using a stylus. The counter 100 shown in this modification is like the counter of FIGURE 2. It has a case 101 having a window 102 and counter wheels 104, 105, 106 and 107. The telescoping shafts are like those of FIGURE 2 extending through a hub 110 on the casing. Wheel 107 has a hub mounted on shaft 35. Wheel 106 has a hub mounted on shaft 36. Wheel 105 has a hub mounted on shaft 37. Wheel 104 has a hub 116 mounted on a boss or journal 118 extending inwardly from the end of the casing 101. The counter wheels can be the same as conventional counter wheels adapted for carry-over from one wheel to the next. The carry-overs may be conventional. The wheels having extending flanges, as shown. Within the flanges on the right hand side are formed continuous internal gears, as may be seen at 120 for the wheel 104, as shown in FIGURE 7. The flanges extending to the left have partial internal gears as shown at 122 for wheel 105 in FIGURE 8. The carry-over is by way of carry-over wheels or gears, as shown at 125, in FIGURE 8, which are journalled on shafts as shown at 127. The length of the interrupted internal gear part 122 is one-tenth of the circumference so that when it passes the gear 125 one-tenth of a revolution, or one step will be transferred or carried over to the next wheel to apply the next count to that wheel.

The carry-over wheels or gears are supported on webs within the casing 101 which also have an additional function of providing journal bearings for certain of the indicator wheels. FIGURES 7 and 8 show one of such webs at 130 between wheels 104 and 105. The ends of the web are shown twisted through 90 degrees, as indicated at 132, so they can slide endwise into slots, as shown at 134 and 136 inside of the casing 101. The web 139 is different in that on the right it has a hollow hub 140 in which is received the hub 141 on wheel 106. On the left it has a hub 143 in which is received a hollow hub 144 on the wheel 105. The web 147 is like the one just described except that its hub on the right hand side, as indicated at 150, is slightly larger to accommodate the larger hub 151 on wheel 107 which is on the larger shaft 35. From the foregoing it will be seen that no part of any wheel has sliding frictional engagement with a part of another wheel or with a part of a shaft with which another wheel has sliding frictional engagement. The same applies to the shafts. No wheel can be undesirably turned as a result of frictional engagement with another rotating part. With reference to the gear or wheel 107 it is in effect in two parts with a center shaft part journalled in the web, as is apparent from FIGURES 6 to 8.

All of the elements as shown in FIGURE 6 can be assembled endwise in the casing 100. The webs, are of course, mounted so that they do not rotate. The elements are assembled in order, the wheels being spaced by the webs and the end plate 101 of the casing can then be attached.

FIGURE 6 shows a form of manual means for counting with the device or computing rapidly. The manual means comprises three similar wheels 155, 156 and 157 on a common shaft 160 journaled in a frame or housing 161. Shaft 160 has partial or interrupted discs on it, which accommodate the telescoping shafts, wheels 155, 156 and 157 turning around the discs. These wheels have internal gears or gear teeth and they mesh respectively with gears 162 163 and 164 which respectively are on shafts 35, 36 and 37. The gear ratio between the wheels and the gears are respectively three to one. Each of the wheels 155, 156 and 157 has thirty dialing stylus holes 167. These holes are equally spaced. Numeral 168 indicates an arcuate panel with numerical indicia on it from zero to nine spaced the same as the holes 167 and the wheels. The wheels are dialed by inserting the stylus into any hole opposite the number on the panel 168 and pulling downward to rotate the wheel, the stylus being stopped by the stop bar 170. As may be seen, if any of the wheels such as 155 is rotated through a third of a revolution, a full revolution is imparted to its respective counter wheel. Thus, if any number is dialed corresponding to the panel 168, that number of counts will be imparted to the respective counter wheel. A counter wheel moves through three times as many degrees as its respective dialing wheel. In this way the numbers from zero to nine occupy only one-third of a circumference corresponding to the circumference of the dialing wheels and all of the numbers are visible from one position. The panel 168 is, of course, circular corresponding to the wheels. The wheels 155, 156 and 157 are arranged in reverse order, as respects the counter wheels, but this presents no particular difficulty since the operator need only dial wheel 155 to place unit counts on wheel 107 and indicia may be provided to indicate units, tens, and hundreds dialing wheels.

FIGURES 9 to 13 show another form of the invention which is similar to that of FIGURES 6 to 8 except that the dialing wheels transfer motion directly to the counter wheels. In this form of the invention the counter is essentially like the counter of FIGURE 1 as indicated at 10 and may be a slightly modified commercial counter. It has counter wheels 180, 181, 182, 183 and 184 which are driven by dialing wheels 186, 187, 188, 189 and 190. The dialing wheels are on a shaft 194 spaced from the shaft 195 of the counter wheels. The dialing wheels are three times the size of the counter wheels, that is, they are in a ratio of three to one so that movement of a dialing wheel through a third of a revolution imparts a full revolution to its respective counter wheel. The number panel 168 is like that of the previous modification and the dialing wheels each have thirty equally spaced dialing holes 167, as in the previous modification. Each dialing wheel is provided with sprocket teeth, as shown at 197, cooperating with sprocket holes 198 along one edge of its respective counter wheel. As may be seen, therefore, any number of counts from one to nine may be quickly imparted to any individual counter wheel so that large numbers can be added rapidly. The counter wheels have conventional carry-over devices between them. As may be seen, when a counter wheel is moved through one step through a carry-over mechanism, this will rotate its respective dialing wheel; this however, is no disadvantage since the dialing wheel retains the same orientation as respects the number panel 168. A conventional reset or clearing lever may be provided.

To facilitate dialing by means of a stylus, a stylus bar or carrier is provided as indicated at 201. It has legs, as shown at 202 and 203 journaled on the shaft 194. The stylus bar 201 carries a group of buttons as designated at 205, 206, 207, 208 and 209, each having a stem as shown at 212 in FIGURE 12. The buttons operate against springs as shown at 214. The stem 212 is in effect the stylus. In order to dial any number, the stylus bar 201 need only be moved up opposite a number on the panel 168. The button 205 is then pressed so that the stem 212 goes into one of the holes in a dialing wheel. The stylus or dialing bar is then pulled down to an extending stop member 215.

Figures 10, 11, 13:
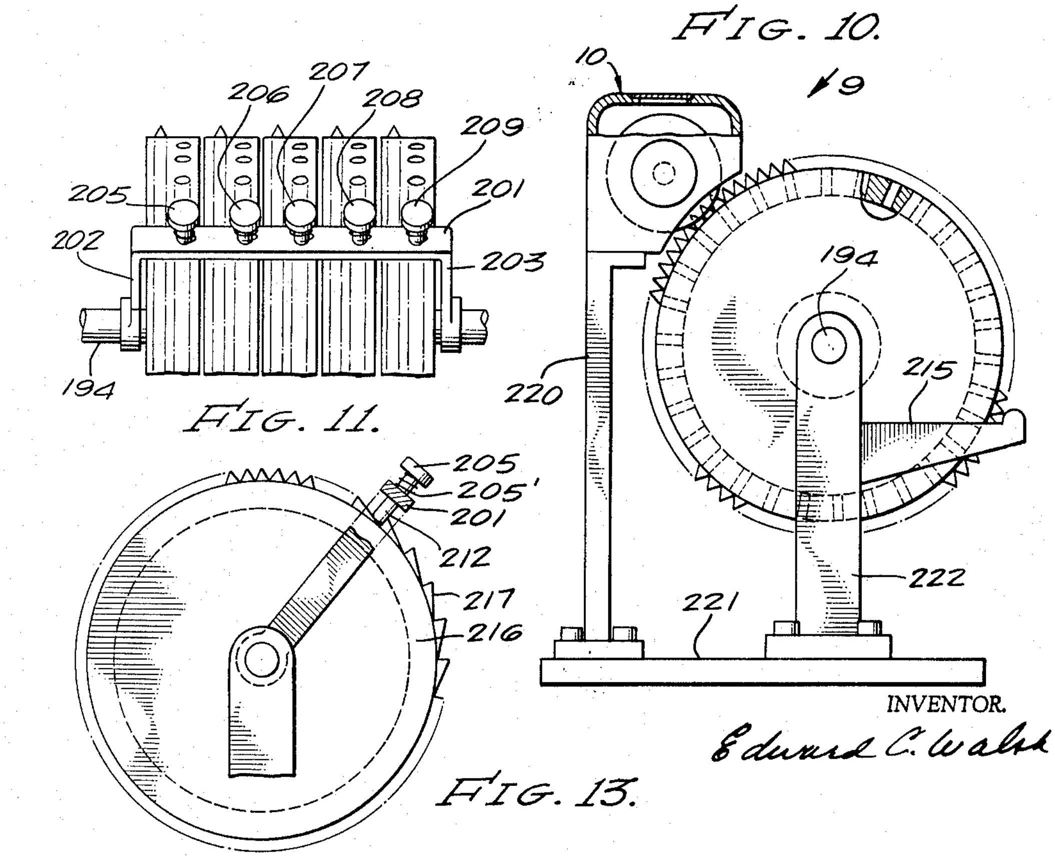

FIGURE 13 shows a modification in which the dialing wheels such as shown at 216 have ratchet teeth as shown at 217 instead of having holes. The stylus bar 201 may be moved upwardly with the stylus or stem 212 sliding over the ratchets. The stylus bar is stopped opposite the appropriate number on panel 168 and when the stylus bar is pulled down the dialing wheel is rotated with it.

FIGURE 10 shows a convenient way of assembling the structure as described. The counter 10 may be on standard or upright 220 mounted on the base 221 with the shaft 194 of the dialing wheels mounted on uprights 222 extending from the base 221.

The devices of several of the forms of the invention can be made in small miniature sizes to be conveniently carried in a handbag or the like and thus are highly adaptable for calculating bridge scores and for similar uses.

Figure 14:
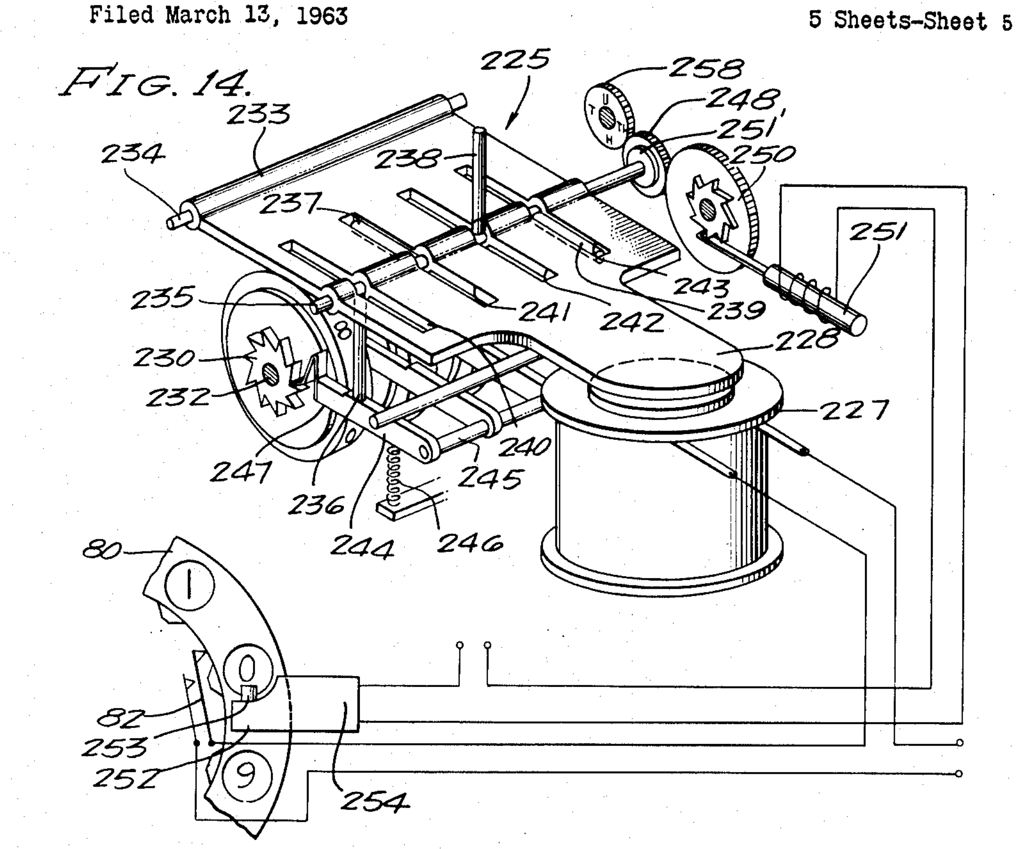
FIGURES 14 to 16 are views of another form of the invention.

FIGURE 14 shows another form of the invention utilizing a counter of the general type shown in FIGURE 5. FIGURE 14 shows an improved form of counter wherein a single electromagnetic actuator may be selectively controlled to feed inputs into any one of the counter wheels. As shown in FIGURE 14, the counter is indicated at 225. Numeral 227 designates an electromagnet having an armature 228, which can actuate the counter wheels. Each counter wheel has a ratchet wheel with ten teeth as designated at 230. These ratchet wheels are alike for each counter wheel. They are mounted on axis 232. The armature is in the form of a plate which is pivoted or hinged as shown at 233 on a pin 234. The armature 228 overlies the counter wheels, as shown. The ratchet wheels are each adjacent their respective counter wheels. Numeral 235 designates a shaft which is journalled in the armature 228 itself and may be mounted in spring clips. This shaft is a pawl sequencing or column setting shaft and has on it four fingers as designated at 236, 237, 238 and 239, which fingers are 90 degrees apart. These fingers operate through the slots 240, 241, 242 and 243 in the armature 228. The first finger 236 cooperates with pawl lever 244 which drives the ratchet wheel 230. The fingers 236 to 239 are positioned to operate their respective ratchet wheels when shaft 235 is sequenced. Pawl levers 244 are on shaft 245 and operate against springs as shown at 246. They have resilient parts 247 to allow the stepping action.

On the shaft 235 is a wheel 248. This wheel is operable by the armature and pawl 250 of an electromagnet 251 controlled by micro switch 252, having a button 253 which is positioned closely adjacent the finger stop 254 associated with the dialing wheel 80 which is like that of FIGURE 5. It can advance shaft 235 through gears 255 and 256. Numeral 258 is a wheel which can be operated manually to set for the wheel which is to receive a count, i.e., the next digit of a number. It is geared to wheel 248 and can be set for units, tens, etc.

The arrangement of these figures provides for adding by dialing numbers in exactly the same way that one dials telephone numbers. The switch 82 controls the electromagnet 227 that operates armature 228. Switch 252 sequences the column setting shaft 235.

The operation of the present embodiment is as follows: The operation will be illustrated by an example of an addition. The numbers are added by dialing the wheel 80, the numbers being dialed in horizontally just as one would dial a telephone number. For instance, in dialing a four digit number, the digit farthest to the left is dialed in first. To illustrate the cycle or sequence, one may begin with the pawl finger 236 in a position to actuate ratchet wheel 232 of the units counter wheel. First the operator adjusts wheel 258 to the TH position previously described. It rotates the pawl sequencing shaft 235 to a position in which the pawl 239 is brought into a position to actuate its respective ratchet wheel at the thousands counter wheel. In this position the finger 239 extends downwardly from the armature 228. The operator now dials the first digit at the left of the number, for example 9, and this puts nine counts on the thousands wheel by way of the switch 82 as described in connection with FIGURE 5. At the completion of this dialing operation the operator's finger engages the switch button 253 at or adjacent the finger stop 254, which by way of the switch 252 actuates the electromagnet 251. Its armature or actuator rotates the wheel 248 through 90 degrees and this advances the pawl sequencing shaft 235 through one step, that is 90 degrees, to bring the finger 238 into position to actuate the ratchet wheel of the next counter wheel, the other pawl fingers being out of actuating position. The operator now dials in the next digit, that is the hundreds digit, and the wheel 80 puts the correct number of counts for example, seven, on the hundreds wheel. Again, at the end of the operation the pawl sequencing shaft 235 is actuated one step so that in the next dialing operation the proper number of counts is placed on the tens wheel, etc. After the last digit of each number is put into the counter, the operator adjusts wheel 258 if necessary depending upon how many digits are in the next number. If there are only two digits it is set at T; if there are three digits it is set at H; and if there are four digits, no adjustment is necessary.

From the foregoing it will be observed that this form of the invention provides for a simple, miniature device, but yet one that has extraordinary capabilities of fast counting and computing manually. The nature of the device is extremely dependable and reliable and will compute accurately. Electromagnets such as 251 are commercially available which will count at the rate of ten or twenty counts per second or faster, which is easily compatible with a reasonable rate of turning the dial 80. The control of the pawl sequencing is simple, but positive and accurate since the operator cannot fail to operate the switch button 253. In making the initial selection of counter wheels by the wheel 258, this operation is entirely dependable and it cannot feed in a count undesirably since, as is shown, it merely applies rotation to the column setting shaft. The device provides not only a simplified device, but a miniature one which makes it possible to very rapidly calculate with only that skill that is necessary to operate a dial telephone. The operation is the same.

From the foregoing, those skilled in the art will observe that the invention realizes all of the objects and advantages stated in the foregoing as well as having many others which have been made clear from the foregoing.

Figures 15, 16:
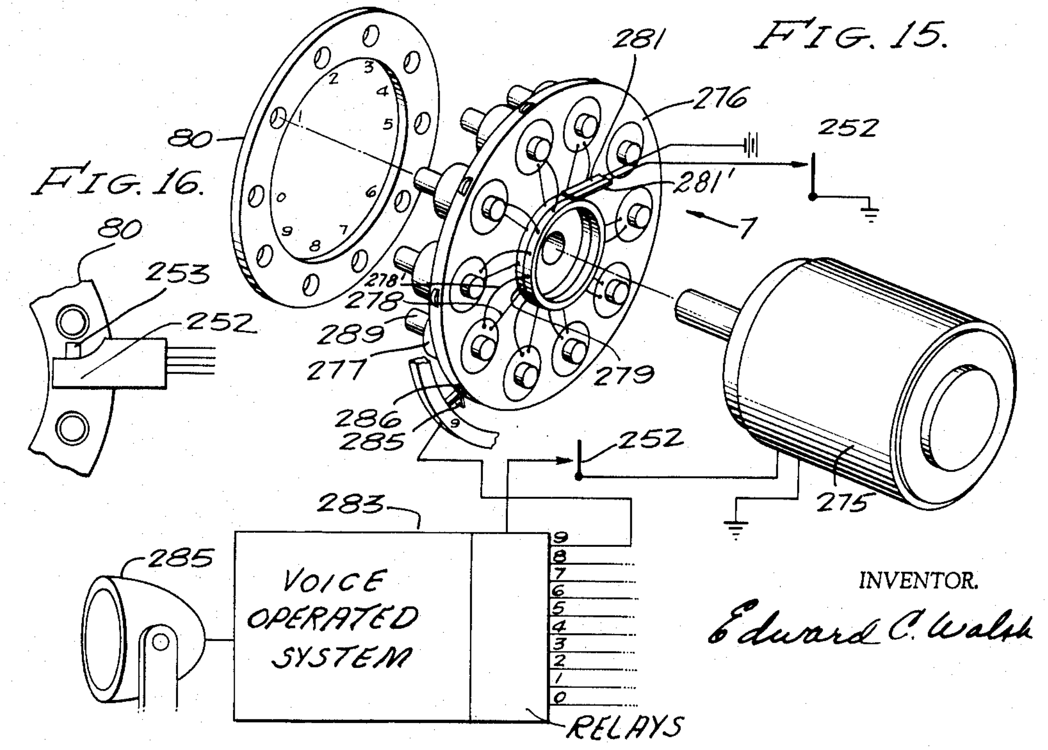

FIGURES 15 and 16 show a device similar to the previous embodiment using a single electromagnet responsive to audible spoken numerical commands from zero to nine. Dial 80 in FIGURE 15 is like that in FIGURE 5, but is driven by motor 275 which drives wheel 276 having ten equally spaced solenoids as for example as shown by numeral 277. Each is connected by a wire 278 and 278' to one slip ring 279 of two slip rings, cooperating with brushes designated at 281 and 282' which are connected to a power source and ground respectively. Motor 275 is on the shaft of wheel 276.

Circuit 283 is driven by microphone 285. It comprises the components described in the Davis patent, and a bank of output relays, one for each output channel.

The circuit through the discriminator distinguishes between spoken commands, zero to nine, and energizes the respective output channels accordingly. Each channel energizes a solenoid such as 277, through a respective brush 285 and contact 286 and at the same time motor 275. Solenoid actuator 289 engages a hole in dial 80 to drive it. Energization of the solenoid closes a switch completing a holding circuit for the solenoid through the slip rings. At the dial 80 terminal point, switch contacts 252' and 252'' are actuated to stop motor 275 and de-energize the solenoid holding circuit.

Circuit 283 may be like that of U.S. Patent No. 2,575,909. The discriminating function may be assisted by particularized pronunciation of the audible commands. Also the microphone may have ten numbered separately sensitized segments, with baffles so that the operator can direct voice commands into particular numbered segments. The wave form of each word number is distinct as to length, peaks, and shape and thus can be discriminated. Obviously ten push button inputs could be used.

The solenoids 277 are individually energized by the output circuits from the relays in the circuit 283. Patent No. 2,575,909 contains a detailed description of a suitable type of circuit, particularly in column 5 of that patent. The vocal pronouncements into the mouth piece of the telephone are distinguished from each other, (e.g.) the numerical digits are distinguished and the resulting output signals selectively energize the relays 19. Accordingly the system of said patent may be used, relays 19 being the output relays corresponding to the ten output circuits representing the digits from 0 through 9. Other equivalent circuits may be used such as referred to in other patents mentioned in Patent No. 2,575,909.

The solenoids move their stems outward just far enough to engage a hole in dial 80 and to engage the button of switch 252 at the "finger stop."

FIG. 17 is a schematic circuit diagram wherein 283 represents the electrical components of the Davis patent and wherein R indicates a relay corresponding to the relay

19 shown in FIG. 1 of the Davis patent. The relay R is the only one shown, it being understood that there is a similar relay and associated circuitry corresponding to each of the relays described in the Davis patent. When the relay illustrated in FIG. 17 is energized by components 283, a circuit is completed through the upper coil 300 and battery 302 to close ganged switch blades 304 and 306. The blade 304 completes a circuit through the battery 302 and a lower or holding coil 308, switch 252' and motor 275. The blade 306 completes a circuit through battery 302, contacts 285 and 286, and through the coil of solenoid 272. The signal received by relay R from components 283 may be in the nature of a single pulse whereas coil 308 will hold the relay energized as long as the circuit is complete through motor 275. Thus, the motor will continue to operate until switch 252' is opened in the manner already described. When the solenoid 277 is energized, as described, its armature 289 is moved to the left to complete a circuit through the solenoid coil, contacts 310, battery 312 and switch 252''. Thus a holding circuit is completed so that subsequent separation of the contacts 285 and 286 will not deenergize the solenoid, the latter being accomplished only upon opening of switch 252'' in the manner already described.

The foregoing disclosure is representative of a preferred form of the invention and is to be interpreted in an illustrative rather than a limiting sense, the invention to be accorded the full scope of the claims appended hereto.

What is claimed is:

1. A calculating device including a counter having a plurality of circular elements having numerical indicia thereon, said elements being mounted to be rotatable about a common axis, carry-over means between adjacent elements whereby a predetermined rotation of one element imparts a step movement to an adjacent element, a single rotary member and selectively operable means actuatable by said member whereby said member may selectively impart rotation individually to desired selected ones of said plurality of circular elements, said rotary member having equally angularly spaced configurations shaped to be selectively engaged by driving means whereby to drive said rotary member through selected fractions of a complete revolution and thereby impart rotation to a selected one of said circular elements, sequencing means conjointly operable with movements of said rotary member, said sequencing means embodying means to select the circular elements to be actuated so that they are actuated in a successive sequence by said rotary member.

2. A device as in claim 1 including means responsive to audible commands and capable of producing discrete electrical output signals, each being representative of a different one of a plurality of spoken numerals and means operative in response to said electrical signals to operate said rotary member whereby to actuate selected of said circular elements in accordance with said commands.

3. A device as in claim 1 wherein said sequencing means is responsive to completion of successive movements of said rotary member whereby to select circular elements to be actuated whereby said elements are actuated sequentially.

4. A device including means responsive to audible commands and capable of producing discrete electrical output signals, each being representative of a different one of a plurality of spoken numerals, readout means comprising a plurality of digit wheels, and means for imparting predetermined rotational movements to individual digit wheels in response to individual signals, the magnitude of the rotational movement depending on the individual input signal.

5. A calculating device including a counter having a plurality of circular elements having numerical indicia thereon, said elements being mounted to be rotatable about a common axis, carry-over means between adjacent elements whereby a full revolution of one element imparts a step movement to an adjacent element, means for rotating at least one of the elements including a single rotary means having a plurality of equally angularly spaced configurations shaped to be selectively engaged by driving means whereby to drive said rotary member through selected fractions of a complete revolution and thereby to impart rotation to a selected one of said circular elements, and means whereby said single rotary means may impart rotation to a plurality of said circular elements, individually, said last means comprising actuating means for individually actuating a plurality of said circular elements and means to operate said actuating means in response to completion of movement of said single rotary means to a terminal position.

6. A device as in claim 5 comprising an electromagnet having an armature provided with means thereon selectively positionable to drive a selected circular element.

7. A device including means responsive to audible commands and capable of producing discrete electrical output signals each being representative of a different one of a plurality of spoken numerals, computer means having a plurality of inter-related movable elements each capable of being moved an amount proportional to the numerals from 1 to 9 and means for operating said elements in response to said output signals in accordance with the numerals represented thereby.

8. A calculating device including a counter having a plurality of circular elements having numerical indicia thereon, said elements being mounted to be rotatable about a common axis, carry-over means between adjacent elements whereby a predetermined rotation of one element imparts a step movement to an adjacent element, a device including means responsive to audible commands and capable of producing discrete electrical output signals, each being representative of a different one of a plurality of spoken numerals, and means for imparting rotation selectively to individual ones of said plurality of circular elements in response to said means responsive to audible commands and in an amount determined by the individual audible command.

9. A device as in claim 8 wherein said means for imparting rotation comprises electromagnetic means and selector means whereby said electromagnetic means may impart rotation individually to any one of a plurality of said circular elements.

10. A device as in claim 9 wherein said selector means comprises a plurality of fingers actuatable by the electromagnetic means and adjustable means for rendering individual fingers effective or ineffective to actuate a circular element.

11. A device as in claim 9 including sequencing means cooperable with said selector means for automatically causing said selector means to select circular elements to be rotated in a predetermined sequence.

12. A device as in claim 9 including mechanism responsive to audible commands and capable of producing discrete electrical output signals, each being representative of a different one of a plurality of spoken numerals and means for actuating said electromagnetic means in response to said mechanism whereby an individual circular element may have rotation imparted to it in an amount determined by the audible command.

13. A calculating device having a plurality of circular elements having numerical indicia thereon, said elements being mounted to be rotatable about a common axis, carry-over means between adjacent elements whereby a predetermined rotation of one element imparts a step movement to an adjacent element, a single rotary member and means whereby rotation of said member may selectively impart rotation individually to desired selected ones of said plurality of circular elements, said means for imparting rotation selectively comprising an electromagnet, said electromagnet having an armature, and mechanism comprising a means carried by the armature adjustable to positions in each of which rotation may be imparted to an individual circular element.

14. The device as in claim 13 wherein said means carried by the armature comprises a rotary member having extending projections which can be positioned into a position for imparting rotation to a circular element upon rotation of the said member.

15. A device as in claim 14 including means for automatically rotating said member in response to input signals for automatically sequencing the imparting of rotation to the circular elements.

References Cited by the Examiner

UNITED STATES PATENTS

| | | | |
|---|---|---|---|
| 1,120,138 | 12/1914 | Druschke. | |
| 2,459,107 | 1/1949 | Johnson | 235—139.1 |

FOREIGN PATENTS

| | | |
|---|---|---|
| 523,319 | 4/1955 | Italy. |

LEO SMILOW, *Primary Examiner.*